(12) United States Patent
Harrison et al.

(10) Patent No.: US 6,451,231 B1
(45) Date of Patent: Sep. 17, 2002

(54) METHOD OF FORMING A HIGH PERFORMANCE STRUCTURAL FOAM FOR STIFFENING PARTS

(75) Inventors: Bruce L Harrison, Sterling Heights; Bradley L Hilborn, Ferndale; Vettithara C Koshy, Bloomfield Hills, all of MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/135,036

(22) Filed: Aug. 17, 1998

Related U.S. Application Data

(60) Provisional application No. 60/056,870, filed on Aug. 21, 1997.

(51) Int. Cl.⁷ ................................................ B29C 44/06
(52) U.S. Cl. .................... 264/45.3; 264/46.4; 264/46.6; 264/53; 264/54; 264/271.1; 264/DIG. 6
(58) Field of Search ............................... 264/45.3, 46.4, 264/53, 54, DIG. 6, 271.1, 46.6

(56) References Cited

U.S. PATENT DOCUMENTS

| | | | |
|---|---|---|---|
| 3,123,170 A | 3/1964 | Bryant | |
| 3,493,257 A | 2/1970 | Fitzgerald et al. | |
| 3,892,819 A | 7/1975 | Najvar | |
| 3,900,543 A | * 8/1975 | Davis | ........................ 264/45.3 |
| 4,090,734 A | 5/1978 | Inami et al. | |
| 4,238,540 A | 12/1980 | Yates et al. | |
| 4,250,136 A | 2/1981 | Rex | ............................ 264/257 |
| 4,252,378 A | * 2/1981 | DeBolt et al. | ......... 264/DIG. 6 |
| 4,397,490 A | 8/1983 | Evans | |
| 4,559,274 A | 12/1985 | Kloppe et al. | |
| 4,562,227 A | 12/1985 | Rogler et al. | ............... 524/786 |
| 4,595,623 A | 6/1986 | DuPont et al. | |
| 4,598,106 A | 7/1986 | Utsugi | |
| 4,610,836 A | 9/1986 | Wycech | |
| 4,623,584 A | 11/1986 | Masui et al. | ............. 428/304.4 |
| 4,751,249 A | 6/1988 | Wycech | |
| 4,836,516 A | 6/1989 | Wycech | |
| 4,853,270 A | 8/1989 | Wycech | |
| 4,861,097 A | 8/1989 | Wycech | |
| 4,876,055 A | 10/1989 | Cattanach | ................... 264/512 |
| 4,901,500 A | 2/1990 | Wycech | |
| 4,908,930 A | 3/1990 | Wycech | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |

(List continued on next page.)

FOREIGN PATENT DOCUMENTS

| | | |
|---|---|---|
| DE | 29 19 046 A | 11/1980 |
| DE | 90 11 147 | 12/1990 |
| DE | 93 20 333 | 7/1994 |
| EP | 0 061 131 | 9/1982 |
| EP | 0 414 302 A1 | 2/1991 |
| EP | 0 453 777 A2 | 10/1991 |
| GB | 628868 | 3/1947 |
| GB | 2061 196 A | 5/1981 |
| GB | 2197 267 A | 5/1988 |
| JP | 01069308 | 3/1989 |
| JP | 01069309 | 3/1989 |
| JP | 02206537 | 8/1990 |
| JP | 5389920 | 2/1993 |
| WO | WO 89/06595 | 7/1989 |
| WO | WO 93/05103 | 3/1993 |

*Primary Examiner*—Allan R. Kuhns
(74) *Attorney, Agent, or Firm*—Stephen D. Harper

(57) ABSTRACT

A high performance structural foam is used for stiffening parts such as plastic parts. The foam could be formulated for in-mold use at elevated temperatures or at ambient temperatures for use with previously molded parts. Various ingredients are used to control the properties of the foam.

41 Claims, 1 Drawing Sheet

U.S. PATENT DOCUMENTS

| | | |
|---|---|---|
| 5,007,643 A | 4/1991 | Okumoto et al. ........... 273/167 |
| 5,019,605 A | 5/1991 | Jannie |
| 5,122,398 A | 6/1992 | Seiler et al. |
| 5,124,186 A | 6/1992 | Wycech |
| 5,252,632 A | 10/1993 | Savin et al. |
| 5,255,487 A | 10/1993 | Wieting et al. |
| 5,258,089 A | 11/1993 | Tanaka et al. ........... 156/324.4 |
| 5,274,006 A | 12/1993 | Kagoshima et al. |
| 5,285,604 A | 2/1994 | Carlin ........................ 52/79.1 |
| 5,453,453 A | 9/1995 | Lamon et al. |
| 5,470,886 A | 11/1995 | Makhlouf et al. |
| 5,575,526 A | 11/1996 | Wycech |
| 5,587,231 A | 12/1996 | Mereer et al. .............. 428/283 |
| 5,665,461 A | 9/1997 | Wong et al. |
| 5,712,317 A | 1/1998 | Makhlouf et al. |
| 5,720,324 A | 2/1998 | Vinciarelli ..................... 141/1 |
| 5,773,121 A | 6/1998 | Meteer et al. .............. 428/117 |
| 5,804,608 A | 9/1998 | Nakazato et al. ........... 521/135 |
| 5,846,357 A | 12/1998 | Meteer et al. ................. 156/77 |
| 5,888,642 A | 3/1999 | Meteer et al. ........... 428/313.5 |

* cited by examiner

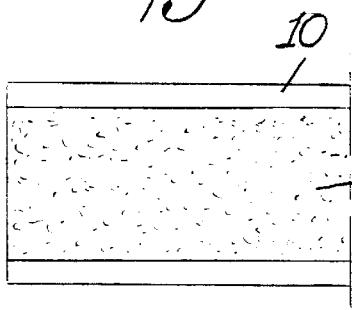
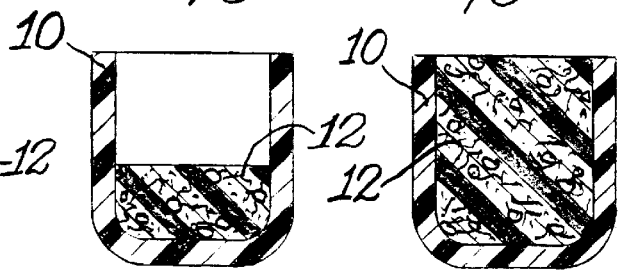
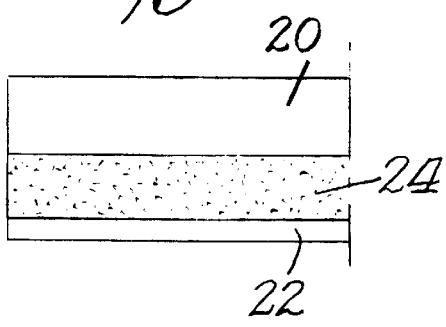
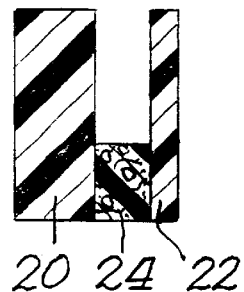
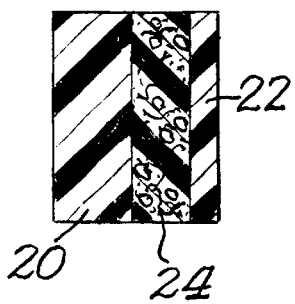
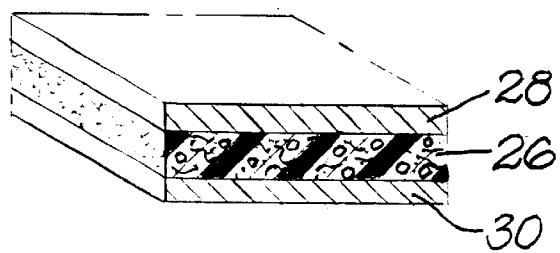

METHOD OF FORMING A HIGH PERFORMANCE STRUCTURAL FOAM FOR STIFFENING PARTS

CROSS-REFERENCE TO RELATED APPLICATION

This application is based upon provisional application Serial No. 60/056,870, filed Aug. 21, 1997.

BACKGROUND OF THE INVENTION

Structural foams are a cost effective way to meet structural requirements with a very low weight. In the automotive industry this means money.

The use of plastic as structural components has been increasing yearly in the building of automobiles. Plastics are lightweight, corrosion proof and in some cases recyclable. There is a cost in strength and in elevated temperature warpage with such plastics. Known plastic materials include sheet molded compounded ("SMC") and ABS materials. In certain applications the strength of the plastic is not sufficient or the weight of the plastic is too much. It would be therefore desirable if some means could be provided to structurally reinforce such plastic materials. It would also be desirable if such means could be used for materials other than plastic and for uses other than in the automotive industry.

SUMMARY OF THE INVENTION

An object of this invention is to provide structural foams which meet the above needs.

A further object of this invention is to provide such structural foams which can be cured under heat or alternatively variations which can be cured at ambient temperature.

In accordance with this invention high performance structural foam is provided for stiffening parts, such as plastic. Such parts could be premolded parts, could be hollow, could be channel shaped or could simply be structural members of any shape which require reinforcement. The foam is preferably a two component syntactic material which may be expandable. The foam preferably contains beads such as glass, ceramic or plastic beads to provide the desired viscosity and to reduce weight and cost. A blowing agent could be used where the foam is expandable. The foam preferably also includes a rheological agent to control flow of the material. A curing system is used to control the polymer properties of the material. In addition, the foam could include diluents filler surface treatment, rubber and fibers as well as other additives.

BRIEF DESCRIPTION OF THE DRAWINGS

FIG. 1 is a top plan view showing a representative plastic part reinforced by structural foam in accordance with this invention;

FIG. 2 is a cross-sectional view in elevation of the part shown in FIG. 1 with the foam in an unexpanded state;

FIG. 3 is view similar to FIG. 2 with the foam expanded;

FIG. 4 is a top plan view of an alternative representative plastic part reinforced by the structural foam of this invention;

FIG. 5 is a cross-sectional view in elevation of the part shown in FIG. 4 with the foam in an unexpanded state;

FIG. 6 is a view similar to FIG. 5 showing the foam in its expanded state; and

FIG. 7 is a perspective view of a pickup truck bed utilizing the invention.

DETAILED DESCRIPTION

The present invention, in general, relates to two component type formulations that could be formulated for in-mold use at elevated temperatures or at ambient temperature applications for filling hollows in previously molded parts. In its broad application the foam resulting from the formulation can be used as a reinforcement in a hollow tubular member, in a channel shaped member having an open top, along side a plate-like member, or around the outside of any such members. The specific part being reinforced is not critical, although to some degree its shape, dimensions and material would affect what the ultimate formulation of what the foam would be. The foam is particularly intended as a reinforcement or stiffener for plastic parts. In its broad aspect, however, the invention may be practiced for reinforcing or stiffening parts made of other types of materials, including metal (such as steel) and fiberglass.

In the practice of this invention, the foam bonds to and makes intimate contact with the part it is reinforcing.

In general, the foam would include a release agent where the foam is cured under heat. Although it is not necessary that the foam be expandable, in the preferred practice of the invention physical or chemical blowing agents may be used for expanding the foam. Different reacting rates of cure would be used to create different foams to meet different processing requirements. Similarly, the density of the foam product can also be varied. The density of the foam is chosen in accordance with the required strength. For example, the lighter the foam then the weaker it is. The foam can be made with a specific gravity of 0.3 or less with compressive strength and modulus that are quite high for its weight.

There are a number of factors that control the formulation in the practice of this invention. Heated mold formulations require internal release agents, slower cured and physical blowing agents that react at higher temperature such as at least 100° F. Ambient temperature products curing, for example, at 77° F., which is considered room temperature require the opposite. Such products should not have release agents because they would be used in pre-molded parts. The reaction heat of the cure must be chosen so that the blowing agent reacts but the part does not melt. Also, the actual amount used in the part must be high enough for its strength requirement, yet low enough to be cost effective. Preferably, the foam is used only in places where the part's strength is not sufficient. Thus, the foam might be at spaced locations to support the part only where necessary.

Density and strength are opposing factors. By incorporating hollow beads, fibers and, for example, titanates in the foam, strength and modulus are much higher than would seem possible. Beads such as glass beads allow a reduction in weight and cost. Fibers function to increase strength and the titanate permits a reduction in weight and cost, thus lowering the cost and achieving higher strength values. When applied appropriately to the part it is possible to achieve the goal of a lightweight, high strength and cost effective part.

As can be appreciated the invention provides the flexibility to be customized to the particular needs as a structural foam for supporting or stiffening various parts. Accordingly, the inventions does not involve a one-product-fits-all type approach. The structural foam would be used only where it is cost effective. The formulating of the foam for the process and its application would be generally only where the strength of the part, such as a plastic part, is not enough or where the weight of the part is too much. Properly chosen formulations result in weight reduction, strength and cost effective solutions to meet the priority in automotive building.

FIGS. 1–3 show a representative application of the invention for reinforcing a plastic part. As shown therein, the part 10 is of U-shape construction having a channel and is made of plastic. Foam 12 is inserted in part 10. Foam 12 is cured at ambient or room temperature such as 77° F., since part 10 is premolded. In FIG. 2 foam 12 is in its unexpanded condition. After curing foam 12 expands to completely fill the channel of part 10.

FIGS. 4–6 illustrate a further variation wherein the part 20 is a plastic plate spaced from a further part 22 which could also be made of plastic or any other material such as steel. Part 22 alternatively might be a support layer for the foam 24 located in the spacing between parts 20 and 22. FIG. 5 illustrates the foam 24 in its unexpanded condition, while FIG. 6 shows the foam 24 to be fully expanded.

FIG. 7 illustrates a practice of the invention as a truck bed, such as for a pickup truck. As shown therein the resulting composite would replace a conventional metal sheet bed. To form the bed, a foam core sheet 26 which is about ½ inch thick is made by pouring the epoxy and curing it for 5 minutes at 350° F. Next layers of reinforced SMC, a fiberglass reinforced sheet is formed on each side of core sheet 26. SMC is an art recognized term for sheet molded compound materials. The layers 28,30 are sequentially molded to core sheet 26 to form a sandwich laminate capable of withstanding loads of 500 pounds. The top layer 28 may have corrugations or any other surface pattern or may be of any shape. Similarly, bottom layer 30 may have any thickness or shape or have any surface pattern. Preferably the three layers are coterminus. For use as a pickup truck bed the laminate is preferably 6 foot by 4 foot.

The following is an exemplary two component formulation of foam core sheet 26:

| COMPONENT A | |
| --- | --- |
| Ingredient | % Weight |
| Epoxy resin | 62.53 |
| Fibre | 11.87 |
| Fumed silica | 2.37 |
| Release Agent | 4.48 |
| Blowing Agent | 5.14 |
| Glass Bubbles | 12.30 |
| Titanate | 0.60 |
| CaO | 0.71 |
| | 100.00 |

Component B would be amine ingredients in an amount equal by weight to component A. Thus, component A is epoxy based while component B is amine based. Component A would have an SPG of 0.95 and while that of component B would be 1.00 with the combined being 0.96. The volume ratio of component A to component B is 3.70:1.00.

It is to be understood that the parts illustrated in FIGS. 1–7 are merely representative parts. The invention could be used, however, for filling hollow tubular parts, for filling the channel of U-shaped parts, as a support on one or both sides of a plate-like part, as a core between two parts, for curved parts, for parts of various geometry and could be used by being applied completely or partially around the outer surface of the part. A particularly useful application of the invention is for stiffening SMC such as to produce a structural beam made of the foam encased in SMC for a pickup truck bed. Other automotive applications include various support rails or hollow rails and pillars, for reinforcing a rocker panel and for reinforcing a drive shaft. The invention, however, is not limited to use in the automotive field, but could have such diverse uses as jet skis.

The invention may thus be considered as being directed to a two component syntactic foam which is preferably expandable. The invention may be practiced with two types of such foam. One type is cured at elevated temperature and the other type is cured at ambient temperature. Both types of foam would have a thermoplastic or thermoset plastic encasing them. The two components would comprise a polymer and a catalyst carrying agent which would, for example, be mixed together and then pumped through a static mixing tube. The foam would be cured by a reaction which would take place quickly where done slower under ambient temperatures or would be done under elevated temperatures. Heat curing could take place in automotive paint ovens such as for e-coating. There are several types of base polymers that could be used. For example, the binding polymer resin can be an epoxy (amine) type or a styrene (peroxide) type or an acrylic (peroxide) type or a urethane.

The density can be varied to suit the needed conditions as can the modulus, tensile strength, color, cost, viscosity, mix ratio and time to cure. The formula and processing conditions would vary in accordance with the considerations of the properties desired for the resulting produced part.

The ambient cured product is different than the heat cured product in that the curing agent chosen must be reactive enough to generate the heat needed to cure and to expand the foam product quickly enough. The heat cured foam product must not generate an extreme exotherm so that the part, particularly a plastic part, will not burn from the inside out from too much heat. Large volume parts generate much more heat than smaller ones. Thus, the reactivity of the curing agent must be chosen for the size part produced. Given these guidelines, one of ordinary skill in the art would know what materials and parameters to use.

The ambient temperature cured product would be used in a premolded or preformed part and cured while in or against the part. The heat cured part could be cured in a mold. For example, the part might be molded and then placed in a mold in which the heat cured foam would be placed. The part being reinforced could be injection molded around the foam. Various known techniques may be used for forming the parts being reinforced and for placing the foam in contact with the parts.

The foam would include a number of possible basic ingredients in the polymer. For example, one ingredient would be beads, preferably made from glass, ceramic or plastic. The beads would be present in an amount of 0–40% by weight of the polymer, with the remainder being the binder and other ingredients. The use of beads controls the viscosity and results in reduced weight and cost of the foam.

The polymer might also include an internal mold release agent or agents which would be used in the heat cured product but not in the ambient temperature cured product. A sufficient amount of release agent would be used which in turn would depend on the type of condition or the mold. A newer mold, for example, would require less release agent. The use of release agents are known in the art, as would be the amounts necessary to achieve its release agent function.

Although the invention may be practiced with a non-expandable foam, it is preferable that the foam be expandable. A chemical or physical blowing agent could be used. For example, a suitable chemical blowing agent would be sodium bicarbonate. A suitable physical blowing agent would be plastic cyclopentane spheres in liquid form which become gaseous.

The polymer should also include a rheological agent such as fumed silica or a fine grade filler such as calcium carbonate. Preferably, the rheological agent would be present in an amount of about 5% by weight, adjusted up or down in accordance with desired results. The rheological agent functions to control flow of the material.

The polymer should also include a curing system such as an epoxy equivalent weight stoichemetric reaction with amine. The curing system controls the polymer properties.

Preferably, the polymer includes up to 10% by weight diluents to lower the viscosity.

The polymer should include filler surface treatments such as silane or titanate which bonds the polymer to the filler and gives stronger physical properties. Titanates are advantageous in reducing the weight and cost. It is only necessary to have, for example, less than 1% by weight of such materials.

A further component for the polymer may include about 5% by weight (adjusted up or down) rubber which increases the toughness of the material.

Fiber, such as made from glass, KEVLAR(RTM) or carbon might be incorporated in the material to increase its strength.

Other additives might be included for any desired purpose to provide color to include a metallic filler for heat transfer purposes etc. A further ingredient could be a flexiblizer material such as epoxies and diluents which act similar to rubber to provide flexibility to the material.

The components or ingredients of the polymer can be varied to provide a virtually infinite amount of possibilities to meet almost any need for compressive modules, compressive strength, tensile strength, specific gravity and flexural modulus.

The specific gravity would be controlled in accordance with the amount and type of beads and the crush strength of the beads versus its weight. Additives would also affect the specific gravity.

Where the foam is expandable the amount of expansion would be controlled by the chemical or physical blowing agents.

The modulus and strength variables would be controlled by the inclusion of rubber, expanding plastic beads, flexibilizers, the volume of the part being reinforced, fibers, and release agents.

Given the guidelines of this invention, one of ordinary skill in the art would know what specific ingredients and their amounts should be used to attain the desired end properties of the foam.

In general, the properties of the uncured materials would be such that it can be added to a mold so that viscosity, thixotropy, specific gravity and time of gel would be balanced appropriately for the intended application.

What is claimed is:

1. A method of stiffening a part comprising formulating a syntactic structural foam from a polymer binding resin, adding to the binding resin a modulus and strength increasing ingredient and a weight reduction and cost reduction ingredient, injection molding the part around the structural foam to thereby stiffen the part.

2. A method of stiffening a part comprising:
  (a) pumping a polymer binding resin, a catalyst carrying agent, and at least one ingredient selected from the group consisting of modulus and strength increasing ingredients and weight reduction and cost reduction ingredients through a static mixing tube to form a mixture;
  (b) locating said mixture against said part; and
  (c) curing the mixture to form a syntactic structural foam.

3. The method of claim 2, wherein the mixture comprises beads.

4. The method of claim 2, where in the mixture comprises glass beads.

5. The method of claim 2, wherein the mixture comprises hollow beads.

6. The method of claim 2, wherein the mixture comprises a blowing agent.

7. The method of claim 2, wherein the mixture comprises a physical blowing agent.

8. The method of claim 2, wherein the mixture comprises a chemical blowing agent.

9. The method of claim 2, wherein the polymer binding resin comprises an epoxy resin.

10. The method of claim 2, wherein the catalyst carrying agent comprises an amine.

11. The method of claim 2, wherein the mixture comprises a rheological agent.

12. The method of claim 2, wherein the mixture comprises a rubber.

13. The method of claim 2, wherein the mixture comprises a diluent.

14. The method of claim 2, wherein the mixture comprises fibers.

15. The method of claim 2, wherein the mixture comprises glass fibers.

16. The method of claim 2, wherein the part is a hollow tubular member.

17. The method of claim 2, wherein the part is selected from the group consisting of automobile pillars, automobile support rails, automotive hollow rails, and rocker panels.

18. The method of claim 2, wherein the syntactic structural foam has a specific gravity of 0.3 or less.

19. The method of claim 2, wherein said mixture comprises expanding plastic beads.

20. A method of stiffening a hollow part comprising:
  (a) pumping an epoxy, an amine, hollow glass beads, and a blowing agent through a static mixing tube to form a mixture;
  (b) locating said mixture against the hollow part; and
  (c) curing and expanding the mixture to form a syntactic structural foam.

21. The method of claim 20, wherein said mixture comprises a chemical blowing agent.

22. The method of claim 20, wherein said mixture comprises a physical blowing agent.

23. The method of claim 20, wherein said mixture comprises expandable plastic beads.

24. The method of claim 20, wherein said mixture comprises fibers.

25. The method of claim 20, wherein the hollow part is a tubular member.

26. The method of claim 20, wherein the hollow part is selected from the group consisting of automobile pillars, automobile support rails, automobile hollow rails, and automobile rocker panels.

27. The method of claim 20, wherein the mixture comprises a titanate.

28. The method of claim 20, wherein the mixture comprises a rheological agent.

29. The method of claim 20, wherein said mixture comprises a rubber.

30. The method of claim 20, wherein said curing is carried out at ambient temperature.

31. The method of claim 20, wherein said mixture comprises a diluent.

32. A method of stiffening a hollow member comprising:
(a) pumping an epoxy resin, an amine, hollow glass beads, expandable plastic beads, a rubber, and a rheological agent through a static mixing tube to form a mixture;
(b) locating said mixture in said hollow member; and
(c) curing and expanding said mixture to form a syntactic structural foam.

33. The method of claim 32, wherein the mixture additionally comprises glass fiber.

34. The method of claim 33, wherein the mixture additionally comprises a titanate.

35. The method of claim 32, wherein the mixture additionally comprises calcium oxide.

36. The method of claim 32, wherein the mixture additionally comprises calcium carbonate.

37. The method of claim 32, wherein the mixture comprises silica.

38. The method of claim 32, wherein said mixture additionally comprises a diluent.

39. The method of claim 32, wherein said curing is carried out at ambient temperature.

40. The method of claim 32, wherein the hollow member is selected from the group consisting of automobile pillars, automobile support rails, automobile hollow rails, and automobile rocker panels.

41. The method as claim 32, wherein the curing is conducted at ambient temperature.

\* \* \* \* \*

UNITED STATES PATENT AND TRADEMARK OFFICE
CERTIFICATE OF CORRECTION

PATENT NO.    : 6,451,231 B1
DATED         : September 17, 2002
INVENTOR(S)   : Harrison et al.

It is certified that error appears in the above-identified patent and that said Letters Patent is hereby corrected as shown below:

Column 5,
Line 59, after "ingredient,", insert therefor -- and --.

Column 8,
Line 12, delete "claim 32", and insert therefor -- claimed in claim 2 --.

Signed and Sealed this

Twenty-second Day of July, 2003

JAMES E. ROGAN
*Director of the United States Patent and Trademark Office*